United States Patent Office 3,258,461
Patented June 28, 1966

3,258,461
DERIVATIVES OF CEPHALOSPORIN C AND RELATED COMPOUNDS AND A METHOD OF THE SYNTHESIS THEREOF
John Derek Cocker, Chalfont St. Peter, England, assignor to Glaxo Laboratories Limited, Greenford, England, a British company
No Drawing. Filed Sept. 16, 1963, Ser. No. 309,331
Claims priority, application Great Britain, Sept. 24, 1962, 36,237/62
26 Claims. (Cl. 260—243)

This invention is concerned with improvements in or relating to antibiotics and in particular with derivatives of cephalosporin C and related compounds.

The constitution of cephalosporin C has been interpreted in terms of the following structure:

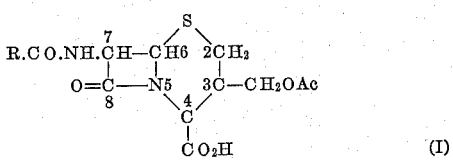

where $R=-(CH_2)_3 \cdot CH(NH_2)COOH$ and consequently the structure of the novel derivatives described below is presented in an analogous fashion.

In application No. 193,015 filed May 7, 1962, there is described the preparation of derivatives of cephalosporin C where the acetoxy group that is part of the substituent at the 3-position is replaced by various nucleophilic groups, the resultant compounds possessing the important advantage of improved stability in vivo, where the derivatives possess antibiotic properties, as compared with cephalosporin C. It has now been found that derivatives of dithiocarbamic acid can also be reacted with cephalosporin C and allied compounds to produce compounds having antibiotic properties or intermediates convertible to such active compounds, the active compounds also possessing improved in vivo stability as compared with cephalosporin C.

According to the invention, therefore, there is provided a process for the production of derivatives of cephalosporin C which comprises reacting in a polar medium a compound of the general formula:

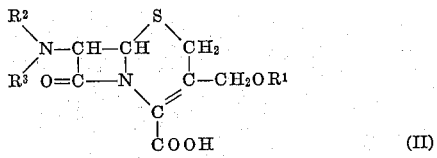

(in which $R^1$ is an acyl group, particularly a lower alkanoyl group, and $R^2$ and $R^3$ are each hydrogen atoms or $R_2$ is a hydrogen atom and $R_3$ is an acyl group or a triaryl substituted alkyl group, e.g. a triphenyl methyl group, or $R^2$ and $R^3$ together form a divalent acyl group derived from a dicarboxylic acid) or a salt thereof, with a nucleophilic compound of the general formula

(in which M is an alkali metal or an ammonium group, $R^4$ is a hydrogen atom or an aliphatic, araliphatic or aryl group and $R^5$ is an aliphatic, araliphatic or aryl group or $R^4$ and $R^5$ together form a divalent group).

Since the group $R^3$ may be the group

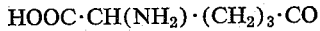

and the group $R^1$ may be an acetyl group it will be appreciated that general Formula II includes cephalosporin C as well as derivatives thereof.

Whilst $R^3$ may represent an acyl group in general terms one may use other specific acyl derivatives representative of alkanoyl, alkenoyl, substituted alkanoyl e.g. aralkanoyl, aryloxyalkanoyl, S-arylthioalkanoyl and S-aralkylthio-alkanoyl, of cephalosporin derivatives as defined herein. These acyl derivatives may be defined as having the general formulae:

(i) $R'(CH_2)_nCO$—where $R'$ is aryl, cycloalkyl, substituted aryl or substituted cycloalkyl and $n$ is an integer from 1–8, preferably 2–4. Examples of these groups include phenylacetyl, nitrophenylacetyl, phenylpropionyl, cyclohexanoyl and thienylacetyl.

(ii) $C_nH_{2n+1}CO$—where $n$ is an integer from 2–7. The alkyl group may be straight or branched and, if desired, may be interrupted by an oxygen or a suphur atom. Examples of such groups include hexanoyl, heptanoyl, octanoyl and butylthioacetyl.

(iii) $C_nH_{2n-1}CO$—where $n$ is an integer from 2–7. The alkenyl group may be straight or branched and, if desired, may be interrupted by an oxygen or a sulphur atom. Examples of such groups include acrylyl and allylthioacetyl.

(iv) $R'OCR''R''' \cdot CO$—where $R'$ has the meaning defined under (i) and $R''$ and $R'''$ are the same or are different and each is a hydrogen atom or an alkyl group. An example of such a group is phenoxyacetyl.

(v) $R'SCR''R''' \cdot CO$—where $R'$, $R''$ and $R'''$ are as defined above. Examples of such thio groups include S-phenyl-trioacetyl, S-chlorophenylthioacetyl and S-bromophenyl-thioacetyl.

(vi) $R'(CH_2)_mS(CH_2)_nCR''R''' \cdot CO$—where $R'$, $R''$ and $R'''$ are as defined above, $m$ is an integer from 1–4 and $n$ is 0 or an integer from 1–4. Examples of such a group include S-benzyl-thioacetyl, benzylthiopropionyl and β-phenethylthioacetyl.

(vii) $R'CO$—where $R'$ has the meaning defined above. Examples of such groups include benzoyl, substituted benzoyl and cyclopentanoyl. Where the benzoyl group is substituted the substituents may be alkyl or alkoxy and the substituents may be in the 2- or 2- and 6-positions. A suitable 2,6-disubstituted benzoyl group is therefore 2,6-dimethoxy-benzoyl.

The reaction may conveniently be effected by incubating the reactants in solution; that is, maintaining the reactants in solution at a moderate temperature, such as, for example, 15–70° C., preferably 37–70° C., for a period of some hours or even days until the desired derivative is obtained in optimum yield. The reaction proceeds particularly well when carried out at a temperature of about 55° C. for a period of from 16 to 24 hours. The reactants are advantageously employed in a ratio of about 1 molar equivalent of the compound of general Formula II to 1–10 molar equivalents of nucleophile. The pH value of the reaction solution is advantageously maintained within the limits 5.0–8, preferably 6–7. If necessary the pH of the solution should be adjusted to the desired value by the addition of a buffering agent such as sodium acetate or, when employing an alkali metal salt of the cephalosporin of general Formula II, by the addition of, for example, acetic acid.

Since the reaction appears to proceed by a polar or ionic mechanism it is necessary to employ a strongly polar medium for the reaction to proceed at a measurable rate. The most generally suitable solvent is water but in those cases in which the nucleophile is not very solubluble in water a mixture of water and a water miscible organic solvent such as dimethylformamide, acetone or ethanol may be employed; suitable proportions for such solvent mixtures are 50:50 (v./v.) to 30:70 (v./v.).

The reaction product may be separated from the reaction mixture, which may contain, for example, unchanged cephalosporin compound and other substances, by a variety of processes including fractional crystallisation, ionophoresis, paper chromatography or by chromatography on ion-exchange resins.

The group M in general Formula III is conveniently sodium or potassium.

Where $R^4$ and/or $R^5$ in generally Formula III is an aliphatic group this is preferably an alkyl group containing 1–6 carbon atoms. Where either group is an aralphatic group this may be a benzyl group or a substituted benzyl group and where either group is an aryl group this may be a phenyl group or a substituted phenyl group. As is stated above $R^4$ and $R^5$ may together form a divalent group. This may be a divalent hydrocarbon group e.g. $-(CH_2)_n-$ where $n$ is 4 or 5 or a C-alkylated, aralkylated or arylated derivative thereof.

Compounds of general Formula III are conveniently prepared according to the following equation:

(where $R^4$, $R^5$ and M have the meanings defined above). They are advantageously used in the form of their alkali metal salts.

The compounds obtained by the process according to the invention are novel and consequently the invention also provides as new compounds compounds of the general formula:

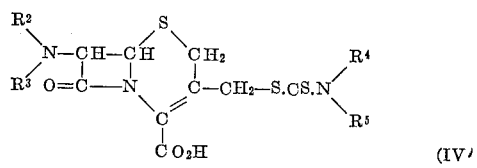

(in which $R^2$, $R^3$, $R^4$ and $R^5$ have the meanings defined above) and their non-toxic salts.

By the term "non-toxic" as used herein in relation to salts, we means salts the anionic portions of which are physiologically compatible in the dosages at which the salts are administered. Preferred salts include alkali metal (e.g. sodium and potassium) salts and salts with amines such as, for example, cyclohexylamine.

The compounds of general Formula IV above will in general have antibacterial activity when at least one acyl group is present on the amine group in the 7-position and some of such compounds show a superior antibacterial activity against certain organisms than does the parent cephalosporin derivative itself.

The compounds according to the invention possessing activity have the important advantage of improved stability in vivo as compared with cephalosporin C coupled with significant activity against gram negative and, particularly, gram positive organisms. The compounds according to the invention are also, in general, water-soluble.

The compounds prepared according to the present invention may be formulated for administration in any convenient way be analogy with other antibiotic substances.

The compounds may thus be made up into injectable preparations in solution or suspension in a suitable medium e.g. sterile, pyrogen-free water. Alternatively they may be formed into compositions suitable for oral administration e.g. by mixing with solid excipients and then, if desired, compressing into tablets or filling into capsules. They may also be mixed with suitable bases for presentation as suppositories.

The compounds according to the invention may be administered in combination with other antibacterial antibiotics especially the penicillins such as penicillin G and/or the tetracyclines.

In order that the invention may be well understood the following examples are given by way of illustration only. In the examples ultraviolet absorption spectra were determined in aqueous phosphate buffer at pH 6.

EXAMPLE 1

7-(benzylthio) acetamidocephalosporanic acid N,N,-dimethyldithiocarbamate complex (as its sodium salt)

7-(benzylthio) acetamidocephalosporanic acid sodium salt (3.273 g., 7 mmole) was dissolved in water (40 ml.), and sodium N,N-dimethyldithiocarbamate (2.005 g., 11.2 mmole) was added. The reaction mixture was heated at 55° for 24 hrs. and then cooled to room temperature. Ethyl acetate (100 ml.) was added, and the mixture was slowly acidified with 2 N-hydrochloric acid, with frequent shaking, until the aqueous layer was at pH. 3. The ethyl acetate layer was washed with water (25 ml.), and evaporated, and the residue was dissolved in 1:1-acetone-water (20 ml.) and converted into its sodium salt by electrometrically adjusting the pH of the solution to 7.0 with N-sodium hydroxide solution. The acetone was removed, and the aqueous solution was washed with ethyl acetate (25 ml.). A solution of cyclohexylamine hydrochloride (1.355 g., 10 mmole) in water (5 ml.) was added, and the precipitated crude cyclohexylamine salt filtered off. This is fraction A (2.238 g., 53%) which was crystallised from methanol (35 ml.) to give pale cream needles of 7-(benzylthio) acetamidocephlosporanic acid N,N-dimethyldithiocarbamate complex as its cyclohexylamine salt (B; 0.840 g., 20%), λ max. 269 mμ

($E^{1\%}_{1\text{cm.}}$ 397)

of which part (100 mg.) was recrystallised from methanol (2 ml.) to give colourless needles (D; 29 mg.), S max. 269–270 mμ

($E^{1\%}_{1\text{cm.}}$ 392, ε 22,900), $\nu^{\text{Nujol}}_{\text{max.}}$ 1766 (β-lactam), 1658 and 1530 (—CONH—) and 1584 cm.$^{-1}$ (—COO-)

(Found: C, 52.2; H, 5.9; N, 9.5; S, 21.4%.

$C_{26}H_{36}N_4O_4S_4$ requires C, 52.3; H, 6.1; N, 9.4; S, 21.5%). Evaporation of the filtrate from B and recrystallisation of the residue from methanol (10 ml.) gave fraction C (0.248 g., 6%), λ max. 269 mμ

($E^{1\%}_{1\text{cm.}}$ 391)

The recrystallised cyclohexylamine salt was reconverted into the sodium salt as follows: The crystals (1.80 g., 3.04 mmole) were suspended in water (25 ml.), and ethyl acetate (25 ml.) and 2 N-hydrochloric acid (2.00 ml., 4 mmole) were added. The mixture was shaken until the solid had dissolved, and the ethyl acetate layer was then washed with water (10 ml.), and evaporated. The residue was dissolved in 1:1-acetone-water (20 ml.), and the pH of the solution electrometrically adjusted to 7.0 with N-sodium hydroxide solution. The acetone was removed, and the aqueous solution was filtered and freeze-dried to give 7-(benzylthio)acetamidocephalosporanic acid, N,N-dimethyldithiocarbamate complex as its sodium salt (1.566 g., 99%), λ max. 268–9 mμ.

($E^{1\%}_{1\text{cm.}}$ 439, ε 22,800)

$[\alpha]_D^{28}$ —38° (c, 0.924; $H_2O$), $\nu^{\text{Nujol}}_{\text{max.}}$ 1760 (β-lactam), 1670 and 1510 (—CONH—) and 1608 cm.$^{-1}$ (—COO-)

The physical and biological properties of other compounds, as their sodium salts, are listed below. The biological properties are given as MIC values in μg./ml., in the order Staph. aureus, numbers C 864, 604 E, 663, 663 (with serum), Strep. hemolyticus 618 (with serum); S. typhi 481, E. coli 573E, S. typhimurium 804E, Pr. vulgaris C 981 or 431 Ps. pyocyanea 150; C. albicans C 316 and mouse protection figures ($ED_{50}$ mg./kgm./dose) against S. aureus 663 (subcutaneous), E. coli 573 (subcutaneous), S 663 (oral) and E. coli 573 (oral). In the case of the above sodium salt the biological results are 0.08, 0.62, 0.08, >2.5, >2.5, >250, >250, >250, >250, >250, >250, >2.5, >2.50, —, —.

EXAMPLE 2

7-(allylthio) acetamido cephalosporanic acid N,N-dimethyldithiocarbamate complex λ max. 268 mμ (ε 19,500), $R_F$ 0.62 (on paper loaded with sodium acetate, and run at 35° with the system ethyl acetate: n-butanol: 0.1%-sodium acetate=8:1:8).

$v_{max.}^{Nujol}$ 1758, 1658 and 1515, and 1608 cm.$^{-1}$

Biological results: —, 0.62, 0.16, —, —, 250, 125, 125, 125, >250, >250, —, —, —, —.

EXAMPLE 3

7-(n-butylthio)acetamidocephalosporanic acid N,N-dimethyldithiocarbamate complex, λ max. 268 mμ (ε 20,800), $[\alpha]_D^{28.5}$ —42° (c. 1.024; water), biological results —, 0.3, 0.02, —, —, —, >250, 125, —, >250, >250, 2.5, >50, —, —. Cyclohexylamine salt, λ max. 267–9 mμ (ε 24,700). Found: C, 49.3; H, 6.8; N, 9.5; S, 22.6%. $C_{23}H_{38}N_4O_4S_4$ requires C, 49.1; H, 6.8; N, 10.0; S, 22.8%.)

EXAMPLE 4

7-phenylacetamidocephalosporanic acid N,N-dimethyldithiocarbamate complex, λ max. 268–9 mμ (ε 21,100), $[\alpha]_D^{28}$ +4° (c., 0.82; water), biological results 0.04, 0.62, 0.62, 0.62, 2.5, 62, >250, 62, >250, >250, —, —, —, —. Cyclohexylamine salt, λ max. 269 mμ (ε 23,200). (Found: C, 53.9; H, 6.1; N, 9.3%. $C_{25}H_{34}N_4O_4S_3$ requires C, 54.5; H, 6.2; N, 10.2%.)

EXAMPLE 5

7-pentanoylamidocephalosporanic acid N,N-dimethyldithiocarbamate complex λ max. 269 mμ (ε 23,300), $[\alpha]_D^{28}$ —22° (c., 1.00; water), biological results —, 1.25, 0.16, —, —, —, >250, >250, 62, >250, >250, 37.5, >50, —, —. Cyclohexylamine salt λ max. 269 mμ (ε 24,500). (Found: C, 50.6; H, 6.8; N, 10.4; S, 18.5%. $C_{22}H_{36}N_4O_4S_3$ requires C, 51.1; H, 7.0; N, 10.8; S, 18.6%.)

EXAMPLE 6

7-β-phenylpropionamidocephalosporanic acid N,N-dimethyldithiocarbamate (as its sodium salt), M.P. 227° (decomp.), $[\alpha]_D$ —27° (c., 1.0, $H_2O$), λ max. 268–269 mμ (ε 23,000); biological results: —, 0.31, 0.08, —, —, —, >250, >250, >250, >250, 10, >50, —, —. (Found: C, 47.4; H, 4.7; N, 8.1; S, 19.3.

requires C, 47.5; H, 4.8; N, 8.3; S, 19.0%.)

EXAMPLE 7

7-(thienyl-3'-acetamido)cephalosporanic acid N,N-dimethyldithiocarbamate (cyclohexylamine salt), M.P. 181° (decomp.), $[\alpha]_D$ —44° (c., 1.0, dimethylsulphoxide), λ max. 269 mμ (ε 23,800), biological results (on the sodium salt); —, 0.62, 0.08, —, —, —, 250, 125, 16, >250, >250, 10, >50, —, —. (Found: C, 48.8; H, 5.6; N, 10.1; S, 22.6. $C_{23}H_{32}N_4O_4S_4 \cdot \frac{1}{2}H_2O$ requires C, 48.8; H, 5.9; N, 9.9; S, 22.7%.)

EXAMPLE 8

7-(thienyl-2'-acetamido)cephalosporanic acid N,N-dimethyldithiocarbamate complex (cyclohexylamine salt), M.P. 190° (decomp.), $[\alpha]_D$ —53° (c., 1.0; dimethylsulphoxide), λ max. 268 mμ (ε 24,000), biological results (on the sodium salt) —, 0.6, 0.04, —, —, —, 62.5, 16.0, 16.0, >250, >250, 25, >50, —, —. (Found: C, 49.9; H, 6.1; N, 9.8; S, 22.65. $C_{23}H_{32}N_4O_4S_4$ requires C, 49.6; H, 5.8; N. 10.1; S, 23.0%.)

EXAMPLE 9

*7-phenylacetamidocephalosporanic acid piperidinodithiocarbamate complex*

This derivative was prepared by a method analogous to that described in Example 1, but was isolated by a different procedure. During the course of the reaction a dark gum separated that crystallised as white leaflets in dry acetone at —5°. Addition of more acetone to this reaction mixture caused further precipitation of solid product. (No product could be isolated from the reaction mother liquor by the general technique involving the cyclohexylamine salt.) The combined products were collected by filtration and washed with acetone (yield: 28%). They were the sodium salt of the required material. A pure sample of the free acid was prepared by dissolving the crude salt in dimethylsulphoxide, acidifying with excess glacial acetic acid, and precipitation by addition of water. By descending chromatography at 20° on paper loaded with sodium acetate buffer at pH 5.0, the compound had $R_F$ 0.69 (in the system ethyl acetate, n-butanol, 0.1 M-sodium acetate=8:1:8); $R_F$ 0.78 (in the system propanol, water=7:3), μ max. 3680 ($H_2O$), 1775 (β-lactam) 1710 (—COOH), 1670 and 1532 cm.$^{-1}$ (—CONH—), λ max. 270 mμ (ε 22,300), 257 (shoulder) mμ (ε 19,250) (in sodium phosphate buffer at pH 6.0). (Found: C, 52.6; H, 5.4; N. 8.1; S, 19.2. $C_{22}H_{25}N_3O_4S_3 \cdot \frac{1}{2}H_2O$ requires C, 52.8; H, 5.2; N, 8.4; S, 19.2%.)

The 7-acylamidocephalosporanic acid starting materials employed in the above examples were prepared by the methods described in application No. 193,015.

EXAMPLE 10

*Pharmaceutical composition for intra-muscular injection containing 7 - β - phenylpropionamidocephalosporanic acid N,N-dimethyldithiocarbamate-sodium salt (100 mg).*

The active ingredient is dissolved in water for Injection B.P. to give a 10% w./v. solution which is sterilised by aseptic filtration through a No. 5/3 sintered glass filter. The sterile solution is then aseptically distributed into 3 ml. neutral glass ampoules so that each ampoule contains 1.1 ml. (equivalent to 110 mg. of the cephalosporin salt). The addiitonal 10 mg. of active ingredient over and above 100 mg. allows for a 10% loss upon withdrawal. The ampoules are frozen on a bed of solid carbon dioxide and transferred to a free-drying apparatus for the removal of water in conventional manner, being subjected to 0.01 mm. Hg overnight or until the moisture content of the resultant cake is less than 2%. The vacuum is then released to dry nitrogen and the ampoules hermetically sealed in an atmosphere of low humidity not exceeding a relative humidity of 20%. The ampoules are stored in the dry state until required for use, when reconstitution may be effected by the addition of sterile water in which the freeze-dried solid readily dissolves on shaking.

EXAMPLE 11

*Capsule containing 7-β-phenylpropionamidocephalosporanic acid N,N-dimethyldithiocarbamate-sodium salt (100 mg.)*

The active ingredient is homogeneously mixed with an equal quantity by weight of lactose. The mixture is then filled into No. 4 hard gelatin capsules, each containing 200 mg. of the mixture. The capsules are stored in airtight containers.

EXAMPLE 12

*Capsules containing 7-(benzylthio)-acetamidocephalosporanic acid N,N-dimethyldithiocarbamate-sodium salt (100 mg.)*

The active ingredient is homogeneously mixed with an equal quantity by weight of lactose. The mixture is then filled into No. 4 hard gelatin capsules, each containing 200 mg. of the mixture. The capsules are stored in airtight containers.

The results of biological tests carried out on the compounds described in Examples 1-8 above are shown in the following table:

| Example No. | Tube Dilution Assay ($\mu$/ml.) | | | | | | | | | | Yeast | Mouse protection figures ($ED_{50}$/mg./kgm./dose) | | | |
| --- | --- | --- | --- | --- | --- | --- | --- | --- | --- | --- | --- | --- | --- | --- | --- |
| | Gram-positive | | | | | Gram-Negative | | | | | | | | | |
| | Staph. aureus C. 864 | Staph. aureus 604E | Staph. aureus 663 | Staph. aureus 663 (with serum) | Strep. hemolyticus 618 (with serum) | S. typhi 481 | E. coli 573 | S. typhimurium 804 E | Pr. vulgaris C981 or 431 | Ps. pyocyanea 150 | C. albicans C. 316 | Staph. aureus 663 (subcutaneous) | E. coli 573 (subcutaneous) | Staph. aureus 663 (oral) | E. coli 573 (oral) |
| 1 | 0.08 | 0.62 | 0.08 | >2.5 | >2.5 | (¹) | (¹) | (¹) | (¹) | (¹) | (¹) | >2.5 | (¹) | | |
| 2 | | 0.62 | 0.16 | | | 250 | 125 | 125 | 125 | | (¹) | | | | |
| 3 | | 0.3 | 0.02 | | | | (¹) | 125 | | | (¹) | 2.5 | >50 | | |
| 4 | 0.04 | 0.62 | 0.62 | 0.62 | 2.5 | 62 | (¹) | 62 | 62 | (¹) | (¹) | 37.5 | >50 | | |
| 5 | | 1.25 | 0.16 | | | | (¹) | (¹) | 62 | (¹) | (¹) | 10 | >50 | | |
| 6 | | 0.31 | 0.08 | | | | (¹) | (¹) | (¹) | (¹) | (¹) | 10 | >50 | | |
| 7 | | 0.62 | 0.08 | | | | 250 | 125 | 16 | (¹) | (¹) | 25 | >50 | | |
| 8 | | 0.6 | 0.04 | | | | 62.5 | 16.0 | 16.0 | (¹) | (¹) | | | | |

¹ Indicates greater than 250.

I claim:

1. A process for the production of Cephalosporin derivatives which comprises reacting, in a polar medium and at a pH of from 5 to 8, a compound selected from the group consisting of a first compound of the formula $$\begin{array}{c} R^2 \\ \diagdown N-CH-CH \quad CH_2 \\ R^3 \ O=C-N \quad C-CH_2OR^1 \\ \diagdown C \diagup \\ COOH \end{array}$$

in which $R^1$ is lower alkanoyl and $R^2$ and $R^3$ are selected from the group consisting of hydrogen and carboxylic acyl, containing up to 16 carbon atoms, and salts thereof, with from 1 to 10 molar equivalents of a nucleophilic compound of the formula $$M-S-CS-N\diagdown_{R^5}^{R^4}$$

in which M is selected from the group consisting of alkali metals and ammonium and $R^4$ and $R^5$ are selected from the group consisting of alkyl containing from 1 to 6 carbon atoms and alkylene represented by $R^4$ and $R^5$ taken together.

2. A compound selected from compounds of the formula $$\begin{array}{c} H \quad S \\ \diagdown N-CH-CH \quad CH_2 \quad R^4 \\ R^3 \ O=C-N \quad C-CH_2S.CS.N\diagdown \\ \diagdown C \diagup \quad R^5 \\ COOH \end{array}$$

and non-toxic salts thereof, in which $R^3$ is an acyl selected from the class consisting of (a) $R^3(CH_2)_nCO$—where $R^3$ is phenyl, nitrophenyl, chlorophenyl, bromophenyl, lower alkoxyphenyl, lower alkylphenyl, cycloalkyl or thienyl and $n$ is an integer from 1 to 8
(b) $R^4CO$—where $R^4$ contains 2-7 carbon atoms and is alkyl, carboxyalkyl, alkoxyalkyl or alkylthioalkyl
(c) $R^5CO$—where $R^5$ contains 2-7 carbons atoms and is alkenyl, alkylthioalkenyl, alkenylthioalkyl, alkoxyalkenyl or alkenyloxyalkyl
(d) $R^3$—O—$(CH_2)_n$·CO— where $R^3$ and $n$ are as defined above
(e) $R^3$—S—$(CH_2)_n$·CO—where $R^3$ and $n$ are as defined above
(f) $R^3(CH_2)_mS(CH_2)_pCH_2$·CO—where $R^3$ is as defined above and $m$ is an integer from 1 to 4 and $p$ is from 0 to 4
(g) $R^3CO$—where $R^3$ is as defined above and $R^4$ and $R^5$ are selected from the group consisting of alkyl containing from 1 to 6 carbon atoms and alkylene represented by $R^4$ and $R^5$ taken together.

3. A process according to claim 1 in which $R^4$ and $R^5$, together with the nitrogen atom represent piperidino.

4. A process as claimed in claim 26 in which said incubation is effected at a temperature of from 37–70° C.

5. A process as claimed in claim 26 in which said incubation is effected at a temperature of about 55° C. for a period of from 16 to 24 hours.

6. A process according to claim 1 in which the reaction is effected at a pH of from 6.0 to 7.0.

7. A process as claimed in claim 1 in which said polar medium comprises water.

8. A process according to claim 7 in which said polar medium comprises a mixture of water and a water miscible organic solvent.

9. A process according to claim 8 in which the water miscible organic solvent is dimethylformamide, acetone or ethanol.

10. A process according to claim 9 in which said polar medium is a mixture of water and water miscible organic solvent in a proportion of 50:50 (v./v.) to 30:70 (v./v.).

11. A compound as claimed in claim 2 in which $R^4$ and $R^5$ each represents methyl.

12. A compound as claimed in claim 2 in which $R^4$ and $R^5$ represent a divalent hydrocarbon group of the formula —$(CH_2)_n$—, where $n$ is 4 or 5.

13. A compound as claimed in claim 2 in which $R^4$ and $R^5$, together with the nitrogen atom, represent piperidino.

14. 7-(benzylthio) acetamidocephalosporanic acid, N,N-dimethyl dithiocarbamate complex of the formula $$\begin{array}{c} S \\ C_6H_5.CH_2S.CH_2CONH.CH-CH \quad CH_2 \quad CH_3 \\ O=C-N \quad C-CH_2S.CS.N\diagdown \\ \diagdown C \diagup \quad CH_3 \\ CO_2H \end{array}$$

15. 7-(allylthio) acetamidocephalosporanic acid N,N-dimethyl dithiocarbamate complex of the formula $$\begin{array}{c} S \\ CH_2=CHCH_2.S.CH_2.CONH.CH-CH \quad CH_2 \quad CH_3 \\ O=C-N \quad C-CH_2S.CS.N\diagdown \\ \diagdown C \diagup \quad CH_3 \\ CO_2H \end{array}$$

16. 7-(n-butylthio)-acetamidocephalosporanic acid N,N-dimethyl dithiocarbamate complex of the formula

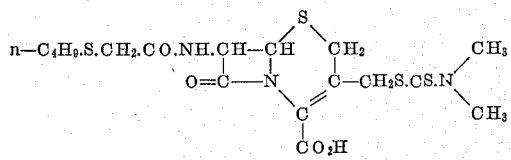

17. 7 - phenylacetamidocephalosporanic acid N,N-dimethyl dithiocarbamate complex of the formula

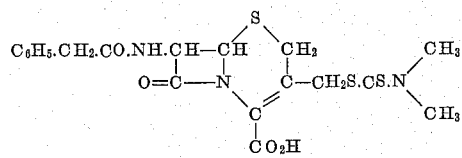

18. 7-pentanoylamidocephalosporanic acid N,N-dimethyl dithiocarbamate complex of the formula

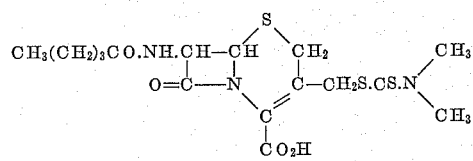

19. 7-β-phenylpropionamidocephalosporanic acid N,N-dimethyl dithiocarbamate complex of the formula

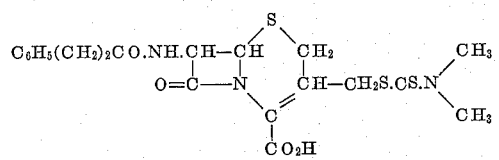

20. 7-(thienyl-3'-acetamido)-cephalosporanic acid N,N-dimethyl dithiocarbamate complex of the formula

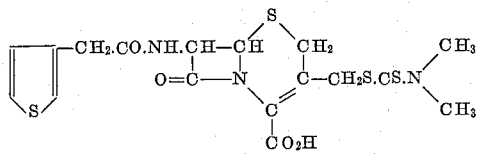

21. 7-(thienyl-2'-acetamido)-cephalosporanic acid N,N-dimethyl dithiocarbamate complex of the formula

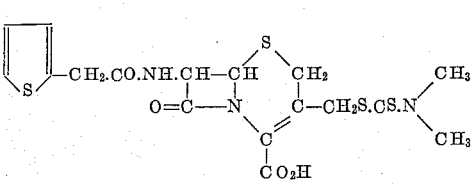

22. 7-phenylacetamidocephalosporanic acid piperidinodithiocarbamate complex of the formula

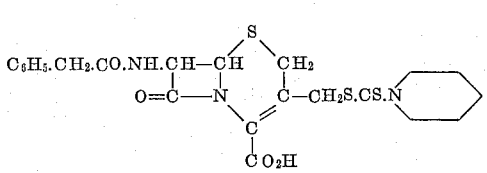

23. A compound as claimed in claim 2 in the form of an alkali metal or amine salt.

24. A process according to claim 1 in which the nucleophilic compound is one in which both $R^4$ and $R^5$ are methyl.

25. A process according to claim 24 in which the nucleophilic compound is sodium N,N-dimethyl dithiocarbamate.

26. A process as claimed in claim 1 in which said first reaction between the compound and the nucleophile is effected by incubating the reactants in solution at a temperature of from 15–70° C.

References Cited by the Examiner

UNITED STATES PATENTS

| | | | |
|---|---|---|---|
| 2,872,375 | 2/1959 | Weitnauer et al. | 167—65 |
| 2,966,442 | 12/1960 | Elias et al. | 167—65 |
| 3,129,224 | 4/1964 | Collins. | |
| 3,167,550 | 1/1965 | Chow et al. | |

HENRY R. JILES, *Acting Primary Examiner.*

J. W. ADAMS, *Assistant Examiner.*